United States Patent [19]
McPherson et al.

[11] Patent Number: 6,063,178
[45] Date of Patent: May 16, 2000

[54] CORRUGATING ADHESIVE, METHOD FOR PREPARING CORRUGATING ADHESIVE, AND CORRUGATED BOARD

[75] Inventors: Roger E. McPherson, Muscatine, Iowa; Arthur G. Schmidt, Swansea, Ill.

[73] Assignee: Grain Processing Corporation, Muscatine, Iowa

[21] Appl. No.: 09/182,918

[22] Filed: Oct. 30, 1998

[51] Int. Cl.[7] .................................................. C09D 101/00
[52] U.S. Cl. .................. 106/163.01; 106/211.1; 106/215.5; 428/154; 156/183; 156/210; 156/291
[58] Field of Search .............................. 106/211.1, 215.5, 106/163.01; 156/183, 210, 291; 428/154

[56] References Cited

U.S. PATENT DOCUMENTS 5,786,048  7/1998  Gesemann et al. ..................... 428/34.6

*Primary Examiner*—David Brunsman
*Attorney, Agent, or Firm*—Leydig, Voit & Mayer, Ltd.

[57] ABSTRACT

Disclosed is a method for the preparation of a corrugating adhesive. The method includes the steps of extracting hemicellulose from a hemicellulose-containing plant source, separating the hemicellulose in a soluble phase from the insoluble portion of the hemicellulose-containing plant source, and mixing the hemicellulose-rich phase with starch to form an adhesive composition. The adhesive composition of the invention exhibits superior shear stability properties as compared with prior art adhesive compositions that incorporate pasted starches, and exhibits superior green tack as compared with prior art hemicellulose-based adhesives. Also disclosed are a corrugated board and a method for preparing same.

11 Claims, No Drawings

CORRUGATING ADHESIVE, METHOD FOR PREPARING CORRUGATING ADHESIVE, AND CORRUGATED BOARD

TECHNICAL FIELD OF THE INVENTION

The present invention is in the field of corrugated board, such as boxboard. More specifically, the invention is directed towards an adhesive composition that is useful for preparing corrugated board, a method for preparing corrugated adhesive, and a corrugated board constructed with the adhesive of the invention.

BACKGROUND OF THE INVENTION

Corrugated board conventionally is prepared by a process known as the Stein-Hall process. As is generally described in U.S. Pat. No. 2,102,937 (issued to J. V. Bauer), the Stein-Hall process employs a corrugating adhesive to bond a corrugated paper "medium," such as a roll or strip, to a liner board on one or both sides of the corrugated medium. Adhesives that are used in conjunction with the Stein-Hall process long have been known, and such adhesives generally comprise an aqueous emulsion of raw starch; caustic; pasted modified or unmodified starch; and a cross-linking agent. The raw starch serves as a binder in the finished corrugated board, while the pasted starch and cross-linking agent form a tacky composition that holds the plural layers of green corrugated board together before the primary starch adhesive has set. The cross-linking of the pasted starch is further thought to impart suspending power and to affect the viscosity of the corrugating adhesive during storage and application. For these reasons, the prior art has taught that the use of pasted starches in corrugating adhesives is necessary.

Known corrugating adhesives suffer from a number of drawbacks. For example, the speed of the machinery used to prepare the corrugated board sometimes is limited by the rheological properties of the adhesive. During manufacture of corrugated board, the corrugating adhesive typically is spread across the liner board or the corrugated paper medium with a spreader knife or metering roller. It has been observed that conventional adhesives undergo substantial shear thinning when they are spread too quickly, thus leading to problems in applying the adhesive to a corrugating medium in conventional corrugating equipment. The shear thinning thus may serve to limit the speed of the corrugating equipment, and thus may limit the attainable output of corrugated board.

Another drawback relates to the green bonding strength of conventional corrugating adhesives and, more specifically, to the rate at which the tack of the adhesive increases when the corrugated board is in the green state. Typically, corrugated board is processed and handled before the adhesive has fully dried, the adhesive thus being in the green state. If the adhesive has not become tacky quickly enough, then the corrugated board will delaminate during the processing operations that follow the bonding operation. The rate of increase of tackiness of known adhesives thus may be a further limiting factor in the rate of manufacture of corrugated board.

It is believed that the rheological instability of conventional corrugating adhesives can be attributed to the presence of pasted starches in the adhesive composition. In recognition of this belief, recent prior art has taught to replace a portion or all of the pasted starch in the corrugating adhesive with hemicellulose, a plant derivative obtained from a hemicellulose-containing plant source such as corn hulls. For example, U.S. Pat. Nos. 5,358,559 and 5,503,668 each purport to provide a corrugating adhesive composed of starch and hemicellulose, the hemicellulose being derived from corn hulls. Similarly, U.S. Pat. No. 5,777,005 purportedly provides a corrugated starch based on a combination of corn hulls and tapioca fiber. Each of these patents teaches to blend corn hulls with starch and to extract hemicellulose in-situ from the corn hulls to provide a hemicellulose-based adhesive composition.

While such recent prior art purports to provide hemicellulose-containing corrugating adhesives, these adhesives are unsatisfactory in some respects. For example, the rate of increase of tack of these adhesives when in green state is unsatisfactory, thus potentially leading to delamination problems if the corrugating operation is run at too high a speed. Thus, while the rheological stability of such corrugating adhesives may be improved as compared with those of corrugating adhesives based on pasted starches, these adhesives still are of limited value in increasing the rate of production of corrugated board.

It is a general object of the invention to provide a corrugating adhesive that is more rheologically stable than conventional corrugating adhesives. Another general object is to provide a corrugating adhesive that has excellent bonding properties, both in the green state with respect to the rate of increase of tack and in the final corrugated board product. Moreover, while the bonding strengths of conventional corrugated adhesives are satisfactory, it is another general object to provide a corrugating adhesive that provides superior bonding strength in a corrugated board.

SUMMARY OF THE INVENTION

It has now been found that hemicellulose and other soluble components of a hemicellulose-containing species may be separated in a soluble phase from cellulose and other insoluble portions of a hemicellulose-containing plant source, and that this soluble phase may be mixed with starch and one or more other components in the absence of the insoluble phase to form an adhesive composition. The rheological properties of the adhesive composition will be surprisingly stable, and the adhesive will provide a strong adhesive bond in a corrugated board product. Moreover, when the adhesive is in the green state in a corrugated board, the tack of the adhesive will be surprisingly improved as compared with other hemicellulose-based adhesives.

In accordance with the invention, a hemicellulose-containing plant source is substantially separated into a soluble phase and an insoluble phase. The soluble phase includes or is mixed with a liquid carrier and starch to form a corrugating adhesive composition. The invention also encompasses a method for preparing a corrugating adhesive, a corrugated board made with the adhesive of the invention, and a method for preparing a corrugated board.

DESCRIPTION OF THE INVENTION

The corrugating adhesive of the present invention generally comprises a liquid carrier, starch, hemicellulose, preferably the hemicellulose-containing soluble phase of a hemicellulose-containing plant source, and caustic, and most preferably further comprises a cross-linking agent. The liquid carrier is preferably water, but may further include polyvinyl alcohol, polyvinyl acetate, or other components as may be known in the art or found to be suitable.

A number of starches are useful in connection with the present invention, and indeed starches such as rye, corn, potato, wheat, sorghum, and tapioca starches all are useful.

The starch preferably is raw and unmodified starch, although starches that have been either pregelled or that have been modified may be found to be useful in connection with the present invention. Preferably, raw corn starch is used in connection with the corrugating adhesive of the invention. The starch is preferably present in the adhesive composition in an amount ranging from about 12% to about 35% by weight, more preferably from about 17 to about 23% by weight. Most preferably, the adhesive composition does not include pasted starch.

The adhesive further includes hemicellulose which, in accordance with the highly preferred embodiment of the invention, is obtained from a hemicellulose-containing plant source and which is separated substantially completely from cellulose and other insoluble components from the plant source in a soluble phase. Hemicellulose is found in a number of plant sources, such as trees, grass, and corn. As set forth in more detail hereinbelow, the hemicellulose most preferably is obtained via extraction in a soluble phase from cleaned corn hulls produced by the corn wet milling industry. To clean the corn hulls, the hulls are destarched. Methods for destarching corn hulls are known in the art, and such methods generally comprise treating the corn hulls with an enzyme (typically α-amylase) under temperature and pH conditions suitable to separate starch from the corn hulls.

The corrugating adhesive further includes caustic and optionally and preferably further includes a cross-linking agent, with the hemicellulose, caustic, and cross-linking agent being present in amounts sufficient to provide tack in green board during the manufacture of corrugated board. The caustic is preferably an alkali metal hydroxide, such as sodium hydroxide, but other caustic chemicals as may be known or found to be suitable may be employed. Similarly, any suitable cross-linking agent may be used in connection with the invention. Many suitable cross-linking agents are known in the art, and examples of such cross-linking agents include borax, boric acid, and borate salts. In accordance with the invention, it has been found that hemicellulose preferably is present in amounts ranging from about 4.2 to about 6.6% by weight of the adhesive composition (about 25.0% to about 44% of the starch on a dry basis), more preferably from about 4.2 to about 4.9% by weight (about 25.0% to about 27.7% of the starch on a dry basis). The cross-linking agent is an optional ingredient and, when used, is employed in an amount effective to enhance cross-linking of the adhesive. When used, the cross-linking agent preferably is present in an amount ranging from about 0.01% up to about 0.1% by weight of the adhesive composition (up to about 0.6% of the starch on a dry basis), and the caustic is preferably present in an amount sufficient to provide a pH of at least about 12.5. Preferably, the caustic is present in an amount of about 0.25 to about 1.0% by weight of the adhesive composition, and more preferably about 0.40 to about 0.66% by weight. It is contemplated that caustic may or may not need to be added to the solution if the hemicellulose is obtained in a caustic solution.

When moisture resistance is desired, the corrugating adhesive may include a moisture-resistance agent, which may be present in an amount effective to impart moisture resistance to adhesive resistance. Preferably, the moisture-resisting agent is a ketone-formaldehyde resin or a melamine-formaldehyde resin. One suitable resin is sold under the trademark AQUA-TITE by Grain Processing Corporation of Muscatine, Iowa, which resin or resins may be added in a total amount ranging from about 2% to about 4% (about 2–3% based on adhesive solids) in the adhesive composition. Other moisture-resistance agents as may be known in the art or as may be found to be suitable for use in connection with the invention further may be employed to impart moisture resistance.

In accordance with the preferred embodiment of the invention, hemicellulose is removed from the hemicellulose-containing plant source in a soluble phase, by which is meant that at least a majority of the hemicellulose component of the plant source, and preferably substantially all of the hemicellulose portion, is separated from insoluble components of the plant source. For example, when the hemicellulose-containing species comprises corn hulls, the soluble phase preferably is extracted from the corn hulls, the extraction being conducted by heating an aqueous alkaline slurry of the corn hulls to a temperature of at least about 130° F., and more preferably at least about 212° F. (100° C.) for times sufficient to extract a substantial portion of the hemicellulose and other soluble components from the corn hulls. When the corn hull slurry is heated to boiling at atmospheric pressure, it has been found that the slurry should be heated with agitation for a time of at least about 60 minutes, more preferably at least about 80 minutes, and most preferably at least about 120 minutes, to extract the hemicellulose. This time may be substantially shortened if the corn hull slurry is cooked at higher temperatures under pressure. For example, corn hulls may be cooked at 315° F. (157° C.) at 70 psig for a time of about 5 minutes. Generally, any other reaction conditions as may be found to be suitable may be employed in conjunction with the invention.

The soluble phase will contain hemicellulose and other soluble components that are believed to impart beneficial properties to the corrugating adhesive. For example, it is believed that the soluble phase will contain approximately 8% protein hydrolysate, which is believed to contribute to the bond strength of the adhesive. The soluble phase likely will further contain other components, such as salts of fatty acids and glycerin, which are believed to decrease the surface tension of the adhesive composition. The soluble phase further will contain salts of natural acids, such as ferulic acid and cumaric acid. If a moisture-resistance agent is employed, such acids are believed to work in conjunction therewith to enhance the moisture resistance of the adhesive.

After the hemicellulose is extracted from the corn hulls in the slurry, the soluble components of the solution are substantially separated from insoluble components, such as by centrifugation. The soluble hemicellulose and other soluble components of the corn hulls then may be concentrated, or water may be removed substantially completely, such as by evaporation or spray-drying, to provide a solid hemicellulose-containing soluble phase. Alternatively, the hemicellulose solution may be used as is to prepare the adhesive. In either case, when the soluble phase has been so obtained and substantially separated from the insoluble phase, the soluble phase blended with starch in the presence of the liquid carrier, caustic, cross-linking agent, and resin to form an adhesive composition. If a moisture-resistance agent is employed, it preferably is stirred into the adhesive composition during formation of the adhesive composition.

The adhesive is preferably formulated to have a Stein-Hall viscosity of about 25 seconds to about 60 seconds at 100° F. The Stein-Hall viscosity of an adhesive is a quantity that is defined in the art as the length of time for 100 ml of an original volume of about 335 ml of the adhesive at a given temperature to exit a cylindrical vessel via a calibrated orifice having a diameter of approximately 2.73 mm and centrally located in a disc which is approximately 5.8 cm in diameter. The exact Stein-Hall viscosity of the adhesive composition may be adjusted somewhat by varying the relative amounts of starch, hemicellulose, liquid carrier and other ingredients in the adhesive composition.

The manner of mixing the starch with the soluble hemicellulose-containing phase is not critical, and generally any suitable method may be employed. For example, the starch may be mixed with the liquid abstract from the corn hulls in a single vessel, or the corn hulls may be extracted separately and mixed with the starch and other ingredients in a second vessel. Of course, if the hemicellulose-containing soluble phase has been dried, a liquid carrier should be added. For example, when the hemicellulose-containing phase has been spray-dried, it may be reconstituted with a liquid carrier and added to a starch suspension in a separate tank, or the starch may be added in a single tank. Alternatively, the dry components of the adhesive composition may be supplied as a dry mix, to which warm (95°–100° C.) water may be added to provide an "instant" adhesive composition.

The adhesive composition of the invention may be used in a corrugated product, such as a single-facer or double-facer paper corrugated board. Methods for making corrugated board are known in the art, and conventional methods preferably are employed in conjunction with the present invention. Generally, the method of making corrugated board comprises forming a bond between a corrugated paper "medium" and a liner board on one of both faces of the corrugated medium. The bond is formed by applying adhesive to the corrugating medium, and calendaring the corrugating medium and liner board between a hot roller (typically 360° F.). The method of manufacture of the corrugated board otherwise may be conventional or otherwise as may be found suitable. Most preferably, the corrugated board subsequently is formed into boxes.

The following non-limiting Examples are provided to illustrate the present invention.

EXAMPLE 1

Corrugating Adhesive

A corrugating adhesive having the following composition is prepared:

| | |
|---|---|
| Water | 72.66% |
| Raw Unmodified Corn Starch | 20.14% |
| Soluble Portion of alkali-hydrolyzed corn hulls | 6.46% |
| Sodium hydroxide | 0.64% |
| Sodium tetraborate | 0.10% |

EXAMPLE 2

Corrugating Adhesive

A corrugating adhesive having the following composition is prepared:

| | |
|---|---|
| Water | 72.01% |
| Raw Unmodified Corn Starch | 19.96% |
| Soluble Portion of alkali-hydrolyzed corn hulls | 6.40% |
| Sodium hydroxide | 0.63% |
| Sodium tetraborate | 0.10% |

| | |
|---|---|
| -continued | |
| Ketone-Formaldehyde resin | 0.90% |

EXAMPLES 3–11

Preparation of Carrier

An aqueous alkaline reaction mixture of cleaned corn hulls was prepared by adding cleaned (destarched) corn hulls to water to form a slurry at 10% solids, then adding 50% NaOH to give a ratio of NaOH to dry hulls of 1:10. The alkaline slurry was then jet-cooked at 325° F., held at that temperature for about nine minutes, cooled, and stored. The reaction mixture contained water, hemicellulose, cellulose, protein hydrolyzate, saponified fat, glycerol, phenolic acid salts, sodium acetate, and NaOH. Insolubles were removed by centrifugation, and the supernatant was concentrated to 11.6% total solids and 8.16% water soluble corn hull hemicellulose.

EXAMPLE 3

Corrugating Adhesive

A corrugating adhesive having the following composition was prepared in a single tank mixer:

| | |
|---|---|
| Water | 1406 mL |
| Carrier | 3309 g |
| 50% Caustic | 55.0 g |
| Unmodified Corn Starch | 1200 g |

The water, carrier, and caustic were mixed and heated to 100° F. prior to adding the corn starch. After the corn starch was added, the composition was mixed for 15 minutes and cooled to yield an adhesive composition. The Stein-Hall viscosity of the adhesive was measured and was found to be 23.0 seconds at 100° F. The sample was oven dried at 100° C. for 16 hours, and the oven solids content was found to be 26.24%.

The adhesive was subjected to high shear testing in a Cowles Dissolver at 3,500 RPM for 30 seconds, yielding the results shown in the table below.

| ADHESIVE | BROOKFIELD VISCOSITY |
|---|---|
| Before Shearing | 217 cP @ 100 RPM & 93° F. |
| | 210 cP @ 50 RPM & 93° F. |
| | 215 cP @ 20 RPM & 93° F. |
| | 220 cP @ 10 RPM & 93° F. |
| After Shearing | 250 cP @ 100 RPM & 93° F. |
| | 260 cP @ 50 RPM & 93° F. |
| | 275 cP @ 20 RPM & 93° F. |
| | 290 cP @ 10 RPM & 93° F. |

The Stein-Hall viscosity of the adhesive was 21.0 seconds at 100° F. after shearing in the Cowles Dissolver. Additionally, the sheared adhesive maintained its body and film-forming capability, as evidenced by its tendency to form a uniform coating on a flat metal spatula blade when the spatula blade was withdrawn from the adhesive. These results indicate that the Theological properties of the adhesive composition of the invention were stable.

EXAMPLE 3A

Corrugated Board

Films of the adhesive prepared in Example 3 which were 0.004 inches thick were drawn down by means of a Meyer Rod and then applied to single face board by placing the single face board, flute-side down, onto the thin film. The single face board was then positioned flute-side up and a piece of liner board positioned on the adhesive coated flutes. Application of a hot iron at 357° F. to the liner-board for as little as 5 seconds resulted in total bonding. A 5 second application of heat emulates a corrugator with a 60 foot long double backer station running at 720 feet per minute. The strength of the adhesive bond was such that manual delamination of the finished boxboard resulted in 100% fiber tear from the liner.

EXAMPLE 4

Corrugating Adhesive

A corrugating adhesive having the following composition was prepared in a single tank mixer:

| | |
|---|---|
| Water | 1406 mL |
| Carrier | 3309 g |
| 50% Caustic | 55.0 g |
| Sodium Tetraborate 1.0 MOL | 9 g |

The water, carrier, caustic and borate were mixed and heated to 100° F. After the corn starch was added, the composition was mixed for 15 minutes and cooled to form an adhesive composition. The Stein-Hall viscosity of the adhesive thus formed was 47.0 seconds at 100° F., and the oven solids of the adhesive was 26.34%.

EXAMPLE 5

Corrugating Adhesive

An adhesive was prepared in accordance with Example 4 except 3% of a ketone-formaldehyde resin was added on adhesive basis. The adhesive was found to be totally tolerant of the addition of ketone formaldehyde resin. Following the addition of 3% and storage at 100° F. with gentle agitation, the Stein-Hall viscosity was measured to be 39 seconds at 100° F. The oven solids of the adhesive was 26.48%.

EXAMPLE 5A

Corrugated Board

A corrugated board was prepared in accordance with the method set forth in Example 3A using the adhesive of Example 5. The strength of the adhesive bonds was such that manual delamination of the finished board resulted in 100% fiber tear from the liner. When the board was subjected to the conditions of the ASTM D 1028-69 Water Resistance Test, the board survived for 24 hours as an integral piece of combined board, and did not separate into its component papers.

EXAMPLE 6

Corrugating Adhesive

A corrugating adhesive was prepared in accordance with the teachings of the previous Examples. The adhesive composition had the following composition:

| | |
|---|---|
| Water | 1208 mL |
| Carrier | 3678 g |
| 50% Caustic | 52.0 g |
| Unmodified Corn Starch | 1200 g |

The Stein-Hall viscosity of the adhesive was 31.0 seconds at 104° F., and the oven solids of the adhesive was 24.34%.

The adhesive was subjected to high shear in a Cowles Dissolver at 3,500 RPM for 30 seconds, yielding the results shown in the table below.

| ADHESIVE | BROOKFIELD VISCOSITY |
|---|---|
| Before Shearing | 330 cP @ 100 RPM & 94° F. |
| | 350 cP @ 50 RPM & 94° F. |
| | 380 cP @ 20 RPM & 94° F. |
| | 400 cP @ 10 RPM & 94° F. |
| After Shearing | 381 cP @ 100 RPM & 94° F. |
| | 412 cP @ 50 RPM & 94° F. |
| | 455 cP @ 20 RPM & 94° F. |
| | 490 cP @ 10 RPM & 94° F. |

The Stein-Hall viscosity of the adhesive was 43.0 seconds at 94° F. after shearing in the Cowles Dissolver. Additionally, the sheared adhesive maintained its body and film forming capability as evidenced by its tendency to form a uniform coating on a flat metal spatula blade when the spatula blade was withdrawn from the adhesive.

EXAMPLE 6A

Corrugated Board

Corrugated board was prepared according to the method set forth in previous Examples using the adhesive of Example 6. The strength of the adhesive bond was such that manual delamination of the finished boxboard resulted in 100% fiber tear from the liner.

EXAMPLE 7

Corrugating Adhesive

A corrugating adhesive having the following composition was prepared as set forth above. The adhesive had the following composition:

| Single Tank Mixer | |
|---|---|
| Water | 1208 mL |
| Carrier | 3676 g |
| 50% Caustic | 52.0 g |
| Sodium Tetraborate 10 MOL | 3 g |
| Unmodified Corn Starch | 1200 g |

The Stein-Hall viscosity of the adhesive was 47.0 seconds at 95° F., and the oven solids of the adhesive was 24.48% The adhesive was subjected to high shear in a Cowles Dissolver at 3,500 RPM for 30 seconds as shown in the table below.

| ADHESIVE | BROOKFIELD VISCOSITY |
|---|---|
| Before Shearing | 610 cP @ 100 RPM & 90° F. |
|  | 678 cP @ 50 RPM & 90° F. |
|  | 720 cP @ 20 RPM & 90° F. |
|  | 760 cP @ 10 RPM & 90° F. |
| After Shearing | 700 cP @ 100 RPM & 90° F. |
|  | 770 cP @ 50 RPM & 90° F. |
|  | 880 cP @ 20 RPM & 90° F. |
|  | 980 cP @ 10 RPM & 90° F. |

The Stein-Hall viscosity of the adhesive was 61.0 seconds at 90° F. after shearing in the Cowles Dissolver. The adhesive was thus found to be Theologically stable. Additionally, the sheared adhesive maintained its body and film forming capability as evidenced by its tendency to form a uniform coating on a flat metal spatula blade when the spatula blade was withdrawn from the adhesive.

EXAMPLE 7A

Corrugated Board

Corrugated board was prepared as set forth in the previous Examples using the adhesive of Example 7. The strength of the adhesive bond was such that manual delamination of the finished boxboard resulted in 100% fiber tear from the liner.

EXAMPLE 8

Corrugating Adhesive

A corrugating adhesive was prepared in accordance with previous Examples. The adhesive had the following composition:

| Water | 1208 mL |
|---|---|
| Carrier | 3676 g |
| 50% Caustic | 52.0 g |
| Sodium Tetraborate 10 MOL | 6 g |
| Unmodified Corn Starch | 1200 g |

The Stein-Hall viscosity of the adhesive was 73.0 seconds at 98° F. The oven solids of the adhesive was 24.62%.

The adhesive was subjected to high shear in a Cowles Dissolver at 3,500 RPM for 30 seconds, yielding the results shown in the table below.

| ADHESIVE | BROOKFIELD VISCOSITY |
|---|---|
| Before Shearing | 910 cP @ 100 RPM & 100° F. |
|  | 984 cP @ 50 RPM & 100° F. |
|  | 1060 cP @ 20 RPM & 100° F. |
|  | 1130 cP @ 10 RPM & 100° F. |
| After Shearing | 1160 cP @ 100 RPM & 100° F. |
|  | 1210 cP @ 50 RPM & 100° F. |
|  | 1370 cP @ 20 RPM & 100° F. |
|  | 1480 cP @ 10 RPM & 100° F. |

The Stein-Hall viscosity of the adhesive was 70.0 seconds at 100° F. after shearing in the Cowles Dissolver. Additionally, the sheared adhesive maintained its body and film forming capability as evidenced by its tendency to form a uniform coating on a flat metal spatula blade when the spatula blade was withdrawn from the adhesive.

EXAMPLE 8A

Corrugated Board

Corrugated board was prepared as set forth in the previous Examples using the adhesive of Example 8. The strength of the adhesive bond was such that manual delamination of the finished boxboard resulted in 100% fiber tear from the liner.

EXAMPLE 9

Corrugating Adhesive

The concentrated insolubles-free carrier previously described was spray-dried. An aliquot of water (4329 g) was heated to 100° F. and unmodified starch (1200 g), 50% NaOH (55 g) and the spray dried carrier (402 g) were added. The composition was mixed for 15 minutes and cooled to form an adhesive composition. The Stein-Hall viscosity of the adhesive thus formed was 29.0 seconds at 100° F., and the oven solids of the adhesive was 24.57%.

The adhesive was subjected to high shear in a Cowles Dissolver at 3,500 RPM for 30 seconds, yielding the results shown in the table below.

| ADHESIVE | BROOKFIELD VISCOSITY |
|---|---|
| Before Shearing | 274 cP @ 100 RPM & 96° F. |
|  | 292 cP @ 50 RPM & 96° F. |
|  | 325 cP @ 20 RPM & 96° F. |
|  | 360 cP @ 10 RPM & 96° F. |
| After Shearing | 306 cP @ 100 RPM & 96° F. |
|  | 322 cP @ 50 RPM & 96° F. |
|  | 360 cP @ 20 RPM & 96° F. |
|  | 390 cP @ 10 RPM & 96° F. |

The Stein-Hall viscosity of the adhesive was 35 seconds at 93° F. after shearing in the Cowles Dissolver. Additionally, the sheared adhesive maintained its body and film forming capability as evidenced by its tendency to form a uniform coating on a flat metal spatula blade when the spatula blade was withdrawn from the adhesive.

EXAMPLE 9A

Corrugated Board

Corrugated board was prepared as described in the previous Examples using the adhesive of Example 9. The strength of the adhesive bond was such that manual delamination of the finished boxboard resulted in 100% fiber tear from the liner.

EXAMPLE 10

Corrugating Adhesive

A corrugating adhesive was prepared in accordance with Example 9, except that borax was added as a cross-linking agent. The adhesive had the following composition:

| Water | 4329 mL |
|---|---|
| Unmodified starch | 1200 g |
| 50% NaOH | 55 g |
| Spray Dried Carrier | 402 g |
| Borax (1O MOL) | 6 g |

The Stein-Hall viscosity of the adhesive was 56.0 seconds at 96° F., and the oven solids of the adhesive was 24.71%.

The adhesive was subjected to high shear in a Cowles Dissolver at 3,500 RPM for 30 seconds, yielding the results shown in the table below.

| ADHESIVE | BROOKFIELD VISCOSITY |
|---|---|
| Before Shearing | 680 cP @ 100 RPM & 92° F. |
| | 756 cP @ 50 RPM & 92° F. |
| | 845 cP @ 20 RPM & 92° F. |
| | 910 cP @ 10 RPM & 92° F. |
| After Shearing | 840 cP @ 100 RPM & 92° F. |
| | 950 cP @ 50 RPM & 92° F. |
| | 1150 cP @ 20 RPM & 92° F. |
| | 1350 cP @ 10 RPM & 92° F. |

The sheared adhesive maintained its body and film forming capability as evidenced by its tendency to form a uniform coating on a flat metal spatula blade when the spatula blade was withdrawn from the adhesive.

EXAMPLE 10A

Corrugated Board

A corrugated board was prepared as set forth in the previous Examples using the adhesive of Example 10. The strength of the adhesive bond was such that manual delamination of the finished boxboard resulted in 100% fiber tear from the liner.

EXAMPLE 11

Corrugating Adhesive

An adhesive was prepared in accordance with Example 10, except that 3% ketone-formaldehyde resin on a dry basis was added to the adhesive. The adhesive was found to be totally tolerant of the addition of ketone-formaldehyde resin. Following the addition of 3% ketone-formaldehyde resin and storage at 100° F. with gentle agitation, the Stein-Hall viscosity was measured to be 42 seconds at 96° F. The oven solids of the adhesive was 24.85%.

EXAMPLE 11A

Corrugated Board

Corrugated board was prepared in accordance with the previous Examples using the adhesive of Example 11. The strength of the adhesive bond was such that manual delamination of the finished boxboard resulted in 100% fiber tear from the liner. When the combined board was subjected to the conditions of the Water Resistance Test (ASTM D 1028-69), the board survived 24 hours as an integral piece of combined board and it did not separate into its component papers.

EXAMPLE 12

Corrugating Adhesive

An aqueous alkaline reaction mixture of cleaned corn hulls was prepared by adding cleaned corn hulls to water to form a slurry at 10% solids and then adding 50% NaOH to give a ratio of NaOH to dry hulls of 1:10. The alkaline slurry was then heated to 212° F., and held at that temperature with stirring for two hours. The reaction mixture was cooled and stored. The reaction mixture contained water, hemicellulose, cellulose, protein hydrolysate, saponified fat, glycerol, phenolic acid salts, sodium acetate, and NaOH. Insolubles were removed by centrifugation and the supernatant was concentrated to 11.6% solids. The supernatant was used as the carrier in the following adhesive formulation, which otherwise was prepared in accordance with the teachings of Example 3:

| Water | 1406 mL |
|---|---|
| Carrier | 3309 g |
| 50% Caustic | 55.0 g |
| Unmodified Corn Starch | 1200 g |

The Stein-Hall viscosity of the adhesive was 23.0 seconds at 100° F. The oven solids of the adhesive was 26.5%. The adhesive was subjected to high shear in a Cowles Dissolver at 3,500 RPM for 30 seconds, yielding the results shown in the table below.

| ADHESIVE | BROOKFIELD VISCOSITY |
|---|---|
| Before Shearing | 217 cP @ 100 RPM & 93° F. |
| | 210 cP @ 50 RPM & 93° F. |
| | 215 cP @ 20 RPM & 93° F. |
| | 220 cP @ 10 RPM & 93° F. |
| After Shearing | 250 cP @ 100 RPM & 93° F. |
| | 260 cP @ 50 RPM & 93° F. |
| | 275 cP @ 20 RPM & 93° F. |
| | 290 cP @ 10 RPM & 93° F. |

The Stein-Hall viscosity of the adhesive was 21.0 seconds at 100° F. after shearing in the Cowles Dissolver. The adhesive thus was found to be Theologically stable. Additionally, the sheared adhesive maintained its body and film forming capability as evidenced by its tendency to form a uniform coating on a flat metal spatula blade when the spatula blade was withdrawn from the adhesive.

COMPARATIVE EXAMPLE

Corrugating Adhesive and Corrugated Board

Cleaned wet corn hulls were slurried in water and then jet cooked and centrifuged in order to destarch them. The destarched hulls were reslurried and combined with the equivalent of 10% NaOH on dry hulls and jet cooked for a nominal retention time of 9 minutes at a temperature of 305° F. The resulting reaction mixture was assayed to contain 5.19% solids those solids being 97.53% hydrolyzed corn hulls and 2.47% NaOH. Additionally, it was found that 54.16% of the insoluble material within the reaction mixture was retained on a 20 mesh screen.

The reaction mixture was made to recirculate through a Fitz Mill with a 0096 screen for 7 hours and then with a 0040 screen for 5 hours. The reaction mixture then was given a final pass through the Fitz Mill with the 0040 screen. When tested, none of the slurry-ground reaction mixture was retained on the 20 mesh screen.

The aqueous alkaline reaction mixture was used as the carrier in an adhesive composition without separating cellulose and other insoluble components. To prepare the adhesive, 5306 g carrier and 63.4 g 50% NaOH were heated to 100° F. followed by the addition of 34 g 10 MOL borax. The mixture was stirred for fifteen minutes, after which 1500 g corn starch was added. The mixture then was stirred for 35 minutes and was stored in a water bath with agitation at 100° F.

In order to get the adhesive to flow through the 20 mesh screen, it was necessary to shake the screen, which did not retain solids. The Stein-Hall viscosity of the strained adhesive was 36 seconds at 100° F., and the oven solids of the adhesive was 27.4%.

Corrugated board was prepared as set forth in the previous Examples. Application of a hot iron at 357° F. to the liner-board for 5 seconds did not result in total bonding, but instead the strengths of the adhesive bond was such that manual delamination of the finished boxboard was easily accomplished, revealing very wet glue lines. The glue lines had not given up the water as fast as required for the adhesive to be fast running on a corrugator, probably because of the presence of cellulose and possibly other insoluble components of the corn hulls.

Thus, it is seen that the foregoing general objects have been satisfied. The present invention provides a corrugating adhesive that is rheologically stable, and that is useful in connection with high-speed corrugating operations. The adhesive provides an excellent adhesive bond between the corrugating medium and the liner board in corrugated board. Moreover, the tack of the adhesive increases rapidly as compared with known hemicellulose-containing adhesives, thus allowing for an increase in the speed of manufacture of corrugated board.

While particular embodiments of the invention have been shown, it will be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention. All references cited herein are hereby incorporated by reference in their entireties.

What is claimed is:

1. A method for preparing an adhesive composition, the method comprising the steps of:
    hydrolyzing a hemicellulose-containing plant source by heating an alkaline aqueous suspension of said plant source to thereby form a hemicellulose-containing soluble phase and an insoluble phase;
    substantially separating said hemicellulose-containing soluble phase from said insoluble phase;
    optionally separating water from said soluble phase;
    adding starch to said soluble phase in the presence of a liquid carrier under alkaline pH conditions to thereby Form an adhesive composition; and
    adding a borate cross-linking agent.

2. A method according to claim 1, wherein said method further comprises the step of drying said hemicellulose-containing soluble phase prior to mixing said hemicellulose-containing soluble phase with said starch, said method including the step of adding a liquid carrier to said hemicellulose-containing soluble phase.

3. A method according to claim 2, wherein said drying comprises spray-drying.

4. A method according to claim 1, wherein said plant source comprises corn hulls.

5. A corrugating adhesive composition made by the method of claim 1.

6. A method for preparing a corrugated board, the method comprising the step of bonding a strip of corrugated medium to a liner board with the adhesive of claim 5.

7. A corrugated board prepared by the method of claim 6.

8. A method for preparing an adhesive composition, the method comprising the steps of:
    extracting hemicellulose from a hemicellulose-containing plant source by heating said plant source in an aqueous carrier at a temperature of at least about 200° F. under alkaline conditions to form a hemicellulose solution;
    separating insoluble components from said hemicellulose solution to form a hemicellulose-rich phase;
    mixing said hemicellulose-rich phase with starch to form an adhesive composition and
    adding a borate cross-linking agent.

9. An adhesive composition comprising water; caustic; starch; borate cross-linking agent; and the extracted soluble phase of a hemicellulose-containing plant source.

10. An adhesive according to claim 9, wherein said adhesive further includes a moisture resistance agent.

11. An adhesive according to claim 10, wherein said moisture resistance agent is a ketone-formaldehyde resin.

* * * * *

UNITED STATES PATENT AND TRADEMARK OFFICE
CERTIFICATE OF CORRECTION

PATENT NO. : 6,063,178
DATED : May 16, 2000
INVENTOR(S) : McPherson et al.

It is certified that error appears in the above-indentified patent and that said Letters Patent is hereby corrected as shown below:

ON THE TITLE PAGE

Under "References Cited," "U.S. PATENT DOCUMENTS":

--2,102,937   5,358,559   5,503,668   5,577,005   5,855,659--

At Column 6, Line 61:

"Theological" should read --rheological--.

At Column 9, Line 15:

"Theological" should read --rheological--.

At Column 12, Line 29:

"Theological" should read --rheological--.

Signed and Sealed this

Third Day of April, 2001

*Attest:*

NICHOLAS P. GODICI

*Attesting Officer*    *Acting Director of the United States Patent and Trademark Office*